(12) United States Patent
Wang et al.

(10) Patent No.: US 8,311,203 B2
(45) Date of Patent: Nov. 13, 2012

(54) USER-INITIATED RETURN COMMUNICATION

(75) Inventors: Winston Wang, Seattle, WA (US); Adam Holt, London (GB); Feridoon Malekzadeh, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 543 days.

(21) Appl. No.: 12/410,331

(22) Filed: Mar. 24, 2009

(65) Prior Publication Data
US 2010/0246785 A1   Sep. 30, 2010

(51) Int. Cl.
*H04M 3/42* (2006.01)
(52) U.S. Cl. ............................. 379/210.01; 379/209.01
(58) Field of Classification Search ............. 379/210.01, 379/209.01, 88.12; 455/414.1, 418
See application file for complete search history.

(56) References Cited

U.S. PATENT DOCUMENTS

| | | | |
|---|---|---|---|
| 4,788,715 A | 11/1988 | Lee | |
| 4,947,421 A * | 8/1990 | Toy et al. | 379/67.1 |
| 5,850,435 A | 12/1998 | Devillier | |
| 5,872,841 A * | 2/1999 | King et al. | 379/210.01 |
| 5,909,487 A * | 6/1999 | Mainker | 379/209.01 |
| 6,009,157 A * | 12/1999 | Bales et al. | 379/209.01 |
| 6,085,080 A | 7/2000 | Rahikainen et al. | |
| 6,212,268 B1 * | 4/2001 | Nielsen | 379/210.01 |
| 6,266,399 B1 * | 7/2001 | Weller et al. | 379/88.19 |
| 6,459,780 B1 | 10/2002 | Wurster et al. | |
| 6,724,872 B1 | 4/2004 | Moore et al. | |
| 6,768,789 B1 * | 7/2004 | Wilk | 379/67.1 |
| 6,856,677 B2 * | 2/2005 | Leijonhufvud | 379/210.01 |
| 6,868,143 B1 * | 3/2005 | Menon et al. | 379/88.13 |
| 6,970,547 B2 | 11/2005 | Andrews et al. | |
| 7,108,173 B1 | 9/2006 | Wang et al. | |
| 7,333,599 B2 | 2/2008 | Moss et al. | |
| 7,376,226 B2 * | 5/2008 | Holder et al. | 379/210.01 |
| 7,454,009 B2 | 11/2008 | Aupperle et al. | |
| 7,469,044 B2 * | 12/2008 | Kramarz-Von Kohout | 379/209.01 |
| 7,587,032 B1 * | 9/2009 | de Waal | 379/67.1 |
| 7,619,584 B2 * | 11/2009 | Wolf | 345/1.2 |
| 7,706,516 B2 * | 4/2010 | Seligmann | 379/201.07 |
| 7,747,752 B2 * | 6/2010 | Pedersen | 709/227 |
| 2001/0029194 A1 * | 10/2001 | Ketola et al. | 455/567 |
| 2002/0142756 A1 * | 10/2002 | Rutledge et al. | 455/412 |
| 2003/0063732 A1 * | 4/2003 | Mcknight | 379/210.01 |
| 2003/0130882 A1 | 7/2003 | Shuttleworth et al. | |

(Continued)

FOREIGN PATENT DOCUMENTS

CN   200610114765   5/2007

(Continued)

OTHER PUBLICATIONS

Digital Business Phone System, retrieved at <<http://www.digitalbusinessphonesystem.com/interior.asp?nav=nHOPS>>, 1 page.

(Continued)

*Primary Examiner* — Olisa Anwah
(74) *Attorney, Agent, or Firm* — Lee & Hayes, PLLC

(57) ABSTRACT

Techniques to defer an incoming communication and then schedule a follow up communication are disclosed. A communication recipient can defer an incoming communication and schedule a return communication time. The return communication may be manually deferred by a user and/or automatically deferred based at least in part on availability of a user on an appointment calendar.

27 Claims, 12 Drawing Sheets

U.S. PATENT DOCUMENTS

| | | |
|---|---|---|
| 2004/0034700 A1 | 2/2004 | Polcyn |
| 2004/0066928 A1* | 4/2004 | Leijonhufvud .......... 379/211.01 |
| 2004/0078256 A1 | 4/2004 | Glitho et al. |
| 2004/0101121 A1 | 5/2004 | D'Silva et al. |
| 2004/0266399 A1* | 12/2004 | Simpson ..................... 455/412.1 |
| 2005/0089149 A1* | 4/2005 | Elias ......................... 379/88.13 |
| 2005/0141677 A1 | 6/2005 | Hyttinen et al. |
| 2005/0265318 A1* | 12/2005 | Khartabil et al. ............. 370/352 |
| 2006/0093116 A1 | 5/2006 | Baird |
| 2006/0098792 A1 | 5/2006 | Frank et al. |
| 2007/0004383 A1* | 1/2007 | Agozo ....................... 455/414.1 |
| 2007/0036284 A1 | 2/2007 | Raghav et al. |
| 2007/0070940 A1 | 3/2007 | Vander Veen et al. |
| 2007/0198281 A1 | 8/2007 | Abernethy, Jr. et al. |
| 2007/0248221 A1 | 10/2007 | Chatterjee et al. |
| 2007/0274497 A1 | 11/2007 | Murphy et al. |
| 2008/0004793 A1 | 1/2008 | Horvitz et al. |
| 2008/0076395 A1* | 3/2008 | Bhatia et al. .................. 455/413 |
| 2008/0080699 A1* | 4/2008 | Skubnik et al. .......... 379/356.01 |
| 2009/0060155 A1* | 3/2009 | Chingon et al. ......... 379/142.04 |
| 2009/0100469 A1 | 4/2009 | Conradt et al. |
| 2009/0285380 A1 | 11/2009 | Chen et al. |
| 2010/0158220 A1 | 6/2010 | Silverman |
| 2010/0169418 A1 | 7/2010 | Whynot et al. |
| 2011/0170681 A1* | 7/2011 | Kole et al. ..................... 379/162 |
| 2011/0176670 A1 | 7/2011 | Kaplan et al. |

FOREIGN PATENT DOCUMENTS

| | | |
|---|---|---|
| DE | 102007005914 A1 | 8/2008 |
| KR | 20070048499 A | 5/2007 |

OTHER PUBLICATIONS

"Making and receiving calls", Nokia Reference, pp. 49-58.

MCleaner 1.4 (best sms/call reject), posted on Jul. 7, 2008, 2 pages.

Skype, Call reject with custom sound message, 3 pages.

PCT International Search Report and Written Opinion for PCT Application No. PCT/US2010/028480, mailed on Dec. 9, 2010, 11 pgs.

Non-Final Office Action for U.S. Appl. No. 12/833,829, mailed on Dec. 23, 2011, Jonathan L. Mann et al, "Deferred Communication and Relationship Management", 14 pages.

Non-Final Office Action for U.S. Appl. No. 12/410,377, mailed Sep. 30, 2011, Winston Wang, "Calendar-Based Return Communication", 7 pages.

Final Office Action for U.S. Appl. No. 12/410,377, mailed May 11, 2012, Winston Wang et al., "Calendar-Based Return Communication", 8 pages.

Final Office Action for U.S. Appl. No. 12/833,829, mailed on May 15, 2012, Jonathan L. Mann et al, "Deferred Communication and Relationship Management", 17 pages.

* cited by examiner

USER-INITIATED RETURN COMMUNICATION

BACKGROUND

Over the past thirty years, telephony has significantly evolved from the once-ubiquitous public switched telephone service (POTS). Telecommunications consumers today have a wide range of telecommunications options to choose from, including traditional landline telephone service, IP-based telecommunications services (based on, for example, Voice over Internet Protocol), cellular telecommunications services, and converged telecommunications services (such as Unlicensed Mobile Access or UMA).

Telecommunications devices now exist in a myriad of form factors, such as traditional landline phones, cordless phones, cellular telephones, smart phones, PDA phones, desktop and portable computers, media players, home telecommunications hubs, or the like (hereinafter "telecommunication devices"), which have become a ubiquitous part of modern life. Originally, most of these telecommunication devices just provided two-way voice communication between a first person at a first location using a first telecommunication device and a second person at a second location using a second telecommunication device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunication devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunication devices have built-in web browsers for Internet navigation.

Voicemail is another voice communications mode, in which a caller leaves a recorded message for a recipient. The recipient listens and responds to a voicemail message at his or her leisure. Because of the time lag between leaving the message and actually listening or responding to the message, this communications mode is referred to as asynchronous.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. Higher-end telecommunication devices are often referred to as smart phones but increasingly include desktop and portable computers. These telecommunication devices typically have an operating system executed from some form of solid-state memory by one or more processors.

Further, advances in technology have added an ever increasing array of features and capabilities to telecommunication devices, such as touch screens, video and still cameras, web browsing capabilities, email sending and receiving capabilities, music download, storing and playback capabilities, calendar and contact managing capabilities, GPS (global positioning system) location and navigation capabilities, game playing capabilities, and streaming media capabilities, to name a few. Many of these features and capabilities are provided through specialized applications resident on the telecommunications devices. For example, many telecommunications devices allow the user to further customize the device through custom configuration options or by adding third-party software. Some of these applications may come pre-installed by the network service provider or manufacturer, while others may be purchased and installed by the users of the telecommunications devices after purchase.

Although modern telecommunications devices are very capable, their complexity sometimes threatens to interfere with their primary purpose of enabling voice communications. Furthermore, the voice functionality of many telecommunications devices is implemented primarily as a stand-alone feature, and often doesn't benefit significantly from the other capabilities of the telecommunications device.

As an example, a telecommunications device user often receives a voice call from an originating caller while actively engaged in an existing call, an instant messaging session, or while engaged in some other activity during which it would be undesirable to engage in a voice call.

Upon receiving such a call, the telecommunications device user has few options. For example, the user can hang up the current or existing caller or the user can answer the incoming call. Alternatively, the user can let the incoming call "ring" until the caller hangs up, or send the incoming call straight to voicemail. The user could also place the existing caller on hold, answer the incoming call, and then switch back to the existing caller. These capabilities are available on many cellular and IP-based telecommunications networks, and do not require any particular customization of the telecommunications device itself.

Caller ID information may be available to the telecommunications device user, indicating calls that were not answered. A caller may also leave a voicemail for the telecommunications device user. However, by the time the telecommunications device user is able to respond to caller ID or voicemail, he or she may have missed a narrow window of opportunity to reach or communicate with the originating caller.

SUMMARY

Techniques are described for deferring a communication. For example, a telecommunications device user is able to acknowledge an incoming communication and schedule a time to return a communication to the originating caller. In some aspects, the telecommunications device user may also be able to send an asynchronous message, such as a text message, to an originating caller. The asynchronous message to the originating caller may include a time when the telecommunications device user will likely be available or describe what activity is tying up the telecommunications device user at the time of receiving the incoming communication.

In another example, a telecommunications device user is able to create a reminder to return an incoming communication, which is acknowledged but not answered. The telecommunications device provides the telecommunications device user with an option to automatically schedule a return communication at an available time in an appointment calendar. A reminder to originate a return communication can be generated and directed to the telecommunications device receiving the communication and/or to the telecommunications device originating the incoming communication. Additionally, the system or a system component may automatically connect the two devices at a next available time.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
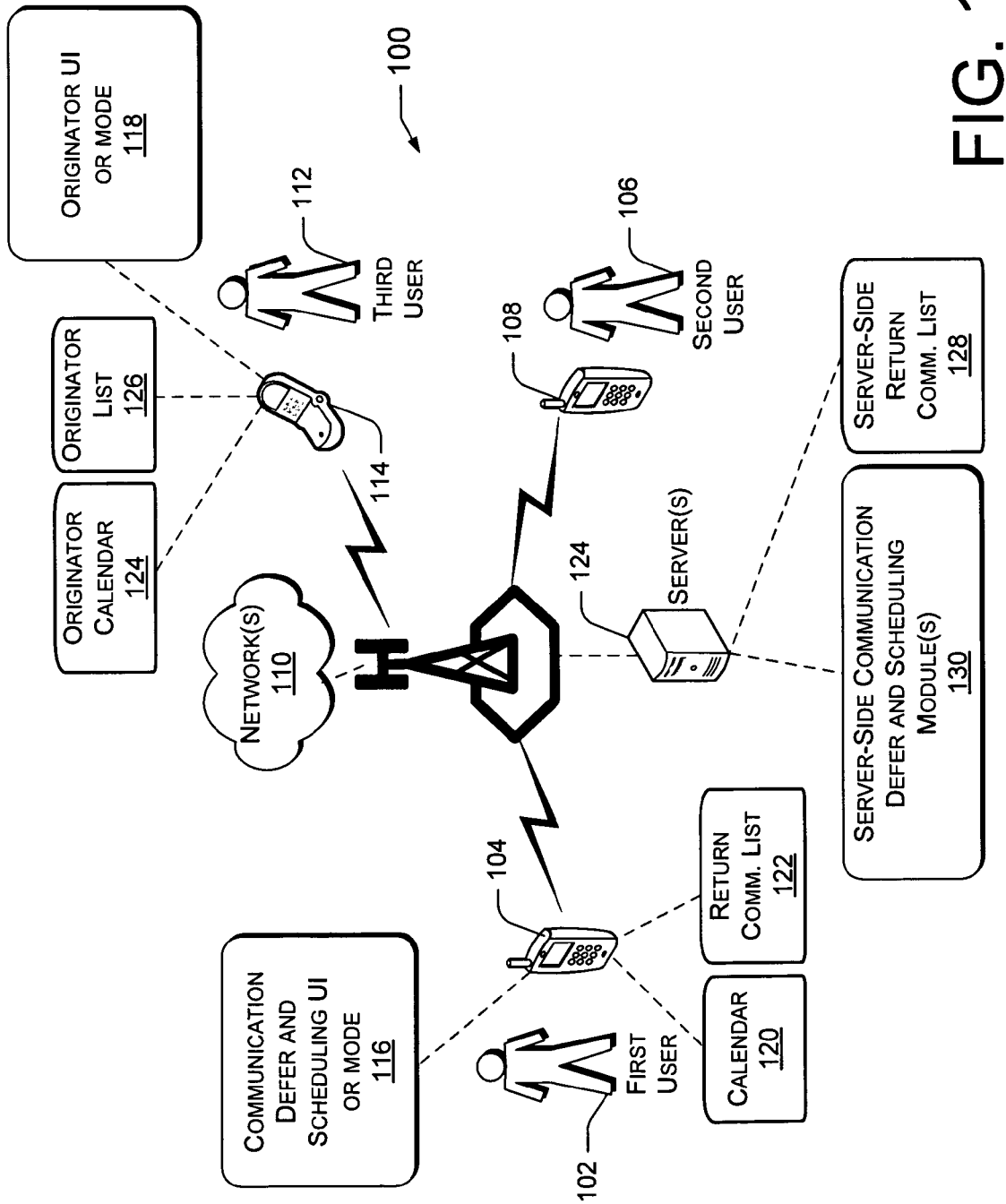
FIG. 1 shows an overview of a system in which a user is able to defer or postpone engaging in a synchronous communication (e.g., a voice call) and to schedule a future time at which to start such a return communication.

This disclosure discusses deferring an incoming communication to a telecommunications device user who is already engaged in an existing communication or is otherwise unavailable to accept an incoming communication. For purposes of illustration only, these features are discussed in the context of a telecommunications device user operating a telecommunication device with a screen and other interface features which allow for the functionality described herein. However, other devices and methods that cause the same or similar results may additionally or alternatively be used. For the sake of brevity, traditional landline phones, cordless phones, cellular telephones, smart phones, PDA phones, desktop and portable computers, media players, home telecommunications hubs, or any other device capable of engaging in telecommunications are referred to herein as "telecommunications devices." Also for the sake of brevity, voice calls, video calls, instant messages and instant messaging sessions, text messages (e.g., Short Message Service or SMS messages), multimedia messages (e.g., Multimedia Message Service or MMS messages), etc., are referred to herein as "communications." Further, for the sake of brevity the term "caller" is used to indicate the originator of a communication, regardless of whether the communication consists of a voice call or a non-voice communication (e.g., an instant message).

Using the techniques described herein, a telecommunications device user can defer or postpone a potential synchronous communication until a later and possibly scheduled time. This application describes several illustrative techniques for scheduling a return communication including 1) a manual scheduling approach, and 2) a calendar-based scheduling approach. Variations and combinations of these approaches are also possible.

In the manual scheduling approach, a time for the return communication is scheduled manually by a user of the recipient telecommunications device. As an example, suppose a user is engaged in a voice call using a telecommunications device and receives another incoming communication (e.g., and incoming voice call or instant messaging session request). In response, the user's telecommunications device alerts the user to the incoming communication and generates a prompt so that the user can indicate how to handle the incoming communication. In addition to the usual options, the prompt allows the user to defer the incoming communication to a later time. Upon receiving an indication or instruction from the user to defer the incoming communication, the telecommunications device or telecommunications device network, with input from the user, schedules a date and time at which to return the incoming communication. In some implementations, the telecommunications device or telecommunications device network may also inform the originating telecommunications device user that the communication has been deferred. At the scheduled time, the telecommunications device or telecommunications device network initiates the return communication automatically, or prompts the telecommunications device user to return the communication. In one implementation, the return communication may be initiated by simply prompting the user through an on-screen dialog or an SMS text message. Alternatively, the telecommunications device network might generate the return communication automatically by simultaneously calling both the user's telecommunications device and the telecommunications device of the originating caller at the scheduled return communication time.

In the calendar-based scheduling approach, a time for the return communication is scheduled at least in part based on an appointment calendar of the recipient, or an appointment calendar of the originating telecommunications user, or appointment calendars of the recipient and of the originating telecommunications device user. As another example, suppose a user is engaged in the voice call as above and receives another incoming communication. In response, the user's telecommunications device alerts the user to the incoming communication. The alert may involve generating a prompt for the user. Upon receiving an instruction from the user to defer the incoming communication, or without input from the user, the telecommunications device or telecommunications device network may add the incoming communication to a list or creates an appointment in an appointment calendar. The telecommunications device or telecommunications device network consults a calendar or list to determine available dates and times at which to return the incoming communication. As in the user-specified scheduling approach, the telecommunications device or telecommunications device network may also inform the originating telecommunications device user that the communication has been deferred. At the scheduled date and time, the telecommunications device or telecommunications device network initiates the return communication automatically, or prompts the telecommunications device user to return the communication. The return communication might be initiated by simply prompting the user through an on-screen dialog or an SMS text message. Alternatively, deferred communications are placed in a list and the user is able to return each previous incoming communication by reviewing the list or appointments created.

System Overview

FIG. 1 shows an overview of an illustrative system 100 within which these techniques may be implemented. FIG. 1 shows possible interactions between a first telecommunications device user 102 using a first telecommunications device 104, a second user 106 using a second telecommunications device 108, and a third user 112 using a third telecommunications device 114. The three telecommunications devices 104, 108 and 114 are part of one or more communications networks 110 that enable voice and other modes of synchronous and asynchronous communication. Although network(s) 110 are represented by a single cell tower commonly associated with a cellular telecommunications network, network(s) 110 represents any type of telecommunications network, including cellular telecommunications networks, IP-based telecommunications networks (e.g., Voice over Internet Protocol networks), traditional landline or POTS networks, or combinations of the foregoing (e.g., Unlicensed Mobile Access or UMA networks).

As an example of how the disclosed techniques might be used, suppose that the first and second telecommunications device users 102 and 106 are engaged in a voice call with each other. While engaged in this call or conversation, the third user 112 places a call to the first user 102. In response to receiving an indication of an incoming call, the first user 102 has the usual options of ignoring it, sending it to voicemail, or of accepting it in lieu of, or in addition to, the existing call with the caller 106. In addition, however, the first user 102 has the option of deferring the incoming call.

To enable this functionality, the first telecommunications device 104 has a communication defer and scheduling user interface (UI) or mode 116. Without breaking communication with the second user 106, the communication defer and scheduling UI or mode 116 allows the telecommunications device user 102 to schedule a time at which to attempt to reach the third telecommunications device 114 and third user 112.

In one implementation, the communication defer and scheduling UI or mode 116 provides a mechanism for the first user 102 to manually select a future time at which to return the incoming communication to the third telecommunications device 114 and third user 112. The communication defer and scheduling UI or mode 116 also may provide the first user 102 with an option to schedule a reminder for the return communication.

In another implementation, upon deferring an incoming communication, the communication defer and scheduling UI or mode 116, may provide a mechanism for the telecommunications device 104 or component of the system 100 to automatically find an available time (e.g., a next available time) and to schedule a reminder for the user to initiate a return communication at the available time. The available time may be found by consulting an appointment calendar 120 of the first user 102, the third user 112, or both. The telecommunications device 104 or component of the system may prompt the first user 102 at the future time to contact the third telecommunications device 114 and thereby the third user 112. Alternatively, a mechanism in the system 100 may prompt the third user 112, through the originator UI or mode 118 or some other means, to reinitiate a communication to the first telecommunications device 104 and the first user 102 at the next available time. In a yet another alternative implementation, the network 110 or component of the network 110 may automatically initiate the communication between first user 102 and third user 112 at the next available and scheduled time for the return communication.

Additionally, in some implementations, the first user 102, through the communication defer and scheduling UI or mode 116, may notify the third user 112 that the incoming communication has been deferred. In this example, the third telecommunications device 114 has an originator UI or mode 118. The originator UI or mode 118 receives a communication from the first telecommunications device 104 and informs the third user 112 that the call placed by the third user 112 has been deferred. The communication from the first telecommunications device 104 may contain the scheduled time or next available time at which the incoming communication is likely to be returned.

In a variation of the example above, the user 102 may defer an incoming call through the communication defer and scheduling UI or mode 116 and place information about the incoming call in a return communication list 122 in the first telecommunications device 104. At a future time, the first user 102 may access the return communication list 122 and contact the third or originating telecommunications device 114 and third user 112. Information about an incoming communication may be placed in a return communication list 122, a server-side return communication list 128 resident on a server 124 in the system 100, or an originator list 126 in the originator telecommunications device 114.

In some implementations, the first telecommunications device 104 may have access to an appointment calendar 120 and/or the third or originating telecommunications device 114 may have access to an originator appointment calendar 124. When this is the case, the communication defer and scheduling UI or mode 116 can reference one or both of the calendars 120 and 124 to find a time that is available to one or both the first user 102 and the third user 112. Once such a time is found, the communication defer and scheduling UI or mode 116 may automatically schedule a return communication or reminder at that date and time, and/or may create an appointment entry in the calendar 120 of the first telecommunications device 104 or originator calendar 124 of the third or originator telecommunications device 114.

One or more components of the system 100 may include logic or instructions for enabling the deferring, scheduling, and/or calendaring of a return communication. For example, the first telecommunications device 104, the third telecommunications device 114, or both, may include software or hardware components which carry out the functionality described herein. Alternatively, a program, module or device in the system 100, such as a server 124 operating a server-side communication defer and scheduling module 130, may carry out some or all of the functionality.

In a further alternative, the communication defer and scheduling module 130 may interact with the communication defer and scheduling UI or mode 116 operating on the first telecommunications device 104 and/or the originator UI or mode 118 operating on the third device 114 to enable the scheduling functions or techniques described herein.

User Interfaces

FIG. 2 through FIG. 8 illustrate a series of example user interfaces that can be used to implement the techniques described herein. These user interfaces also illustrate possible scenarios by which to acknowledge and defer an incoming communication and to schedule a time to re-attempt to establish a communication between the first telecommunications device user 102 and third telecommunications device user 112. Note that these figures are exemplary of a number of different user interfaces and user interface mechanisms that might be used to implement the same or similar functionality.

Scheduling Overview

Figure 2:
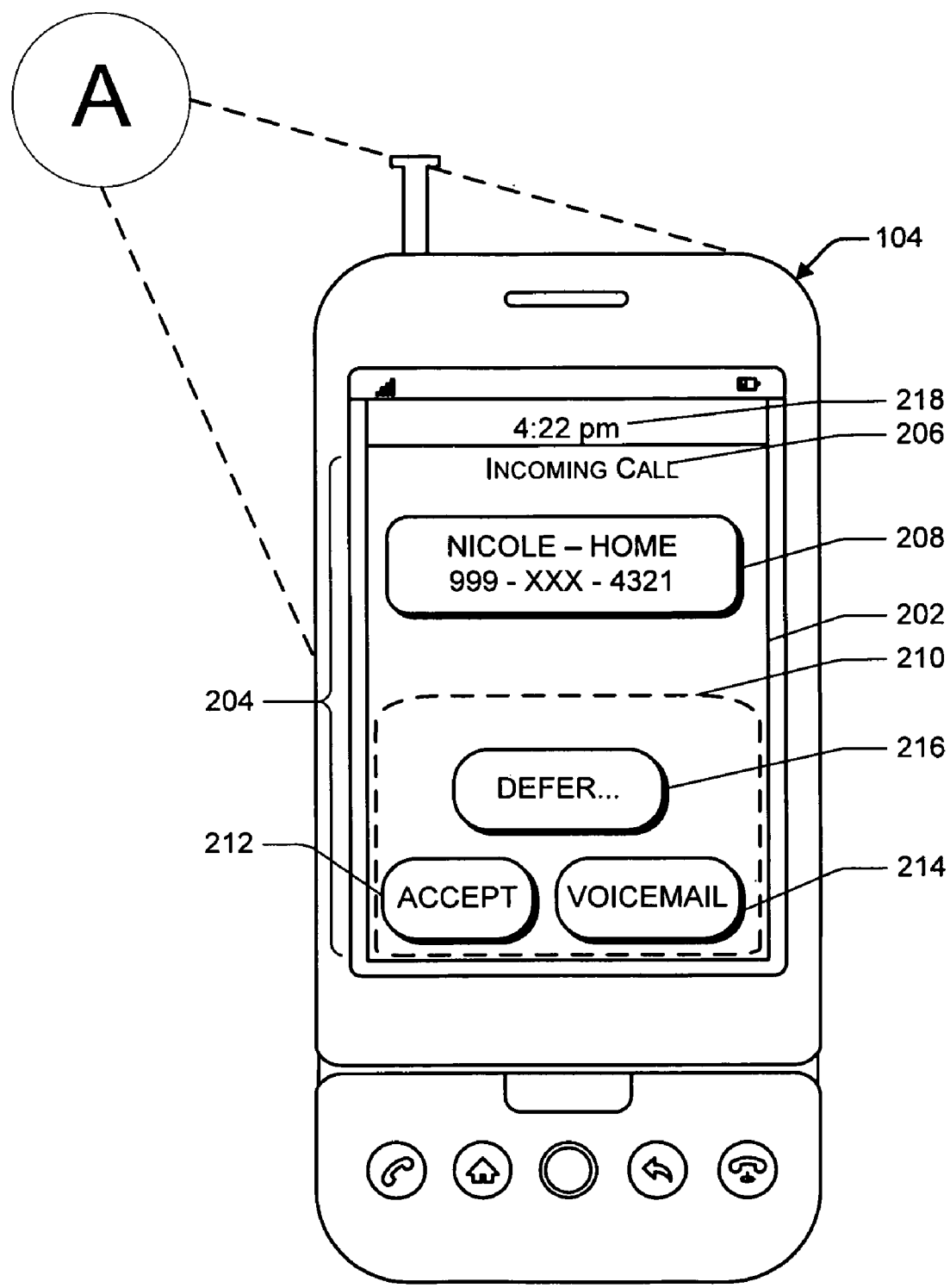
FIG. 2 shows an exemplary user interface on a telecommunications device with one implementation of a control to defer an incoming communication.

FIG. 2 shows an illustrative telecommunications device 104 having a first or initial screen or user interface 204 on a display 202 as seen by a telecommunications device user. Screen 204 includes a notification area 206, which is used to indicate an incoming communication, in this case an "Incoming Call". In addition, or in the alternative, the communication notification may take the form of an audible and/or tactile signal. The initial screen 204 also has a caller ID notification area 208, which indicates information about the incoming communication such as, for example, a caller name, telephone number, and other information.

The initial screen 204 of the user interface also has a communication handling area 210 which includes an accept button 212, a voicemail button 214, and a defer button 216, all of which are presented to the user upon receiving an incoming communication. Pressing the accept button 212 accepts the incoming communication. Pressing the voicemail button 214 sends an incoming voice call to voicemail. Pressing the defer button 216 launches or opens a second screen 302 (FIG. 3), through which the user can set options for rescheduling the incoming communication. Pressing the defer button 216 may also end the incoming communication from the third user 112 and may preempt any voicemail functionality either in the telecommunications device 104 or in the system 100. The initial screen 204 also shows the time 218 when an incoming communication is received or the current time.

Manual Scheduling

Figure 3:
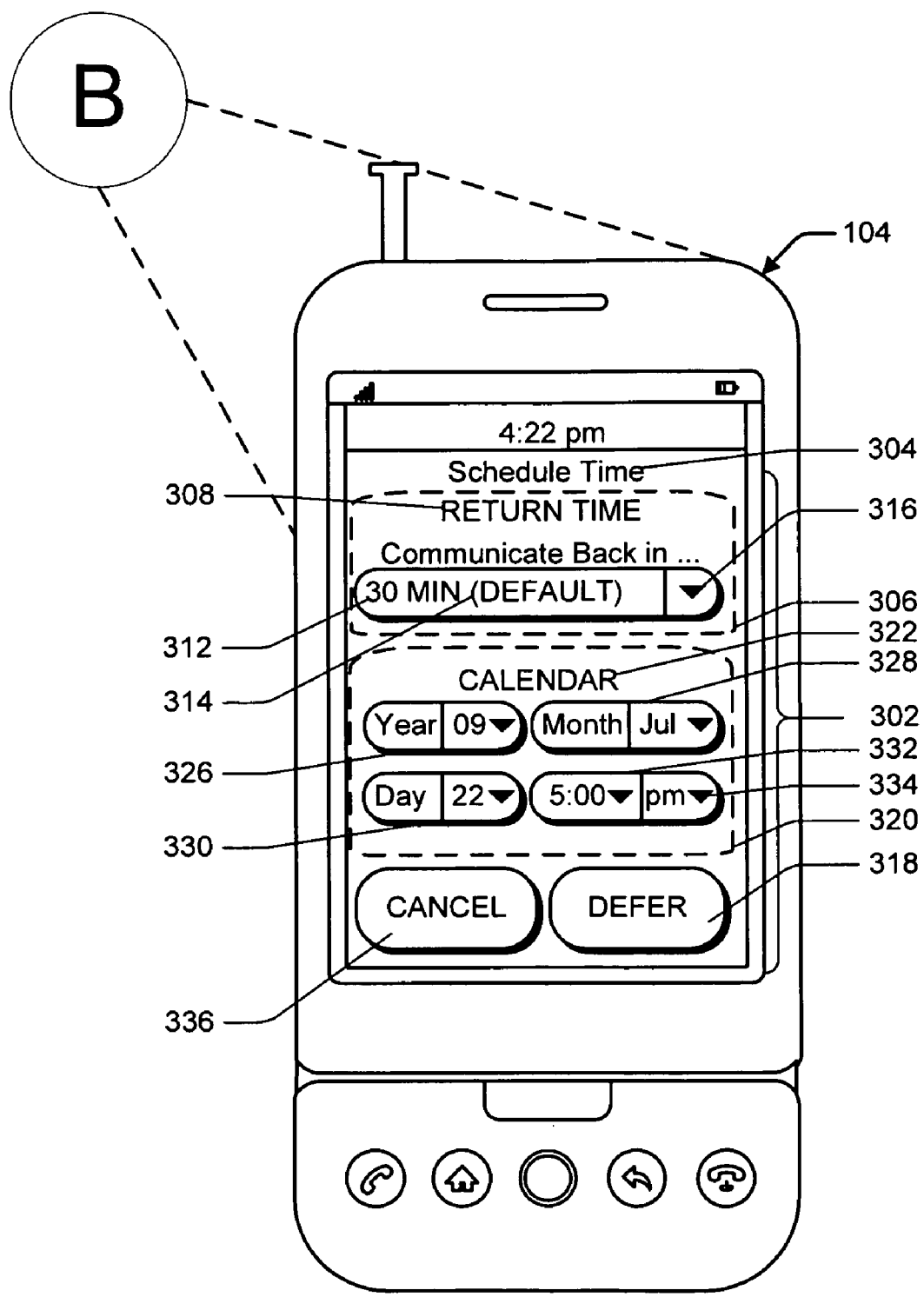
FIG. 3 shows an exemplary user interface on a telecommunications device whereby a user can select a future time at which to schedule a return communication.

FIG. 3 illustrates a manual call defer screen 302, which is launched in response to the user pressing the defer button 216 (shown in FIG. 2) when the first telecommunications device is configured for manual scheduling of deferred communications. The purpose of the manual call defer screen 302 is to set options when manually rescheduling a deferred incoming communication. The manual call defer screen 302 includes a title area 304 indicating this purpose as "SCHEDULE TIME." The manual call defer screen 302 includes two options for manually rescheduling an incoming communication by 1) selecting a return time from a return time configuration area 306 or 2) selecting a date and time from a calendar configuration area 320.

The return time configuration area 306 provides a mechanism to select a return time 312. The return time 312 is a future time from the time of receiving the incoming communication at which to initiate a return communication to the originating telecommunications device. With reference to FIG. 3, the return time configuration area 306 also contains a return time title or title area 308 indicating the purpose of the return time configuration area 306. A particular return time 312 can be a default return time 314 and is marked accordingly. Pressing a defer button 314, without making any change or selection the second screen 302 defers the incoming communication to the default return time 314 (e.g. "30 MIN" meaning 30 minutes as shown in FIG. 3). Selecting a return time popup indicator 316 opens a popup dialog box (not shown) that provides a functionality to enter a value for return time 312 and to select a default return time 314. Selecting a return time 312 and then pressing the defer button 318 creates a reminder with a timer set to the specified return time 312.

A calendar configuration area 320 provides a second option for manually rescheduling an incoming communication. The purpose of the calendar configuration area 320 in this example is to allow a user to manually select a time and date in an appointment calendar such as an appointment calendar 120 of a first user 102 (note that this is different than and not to be confused with the calendar-based scheduling described below). The calendar configuration area 320 may include a year field 326, a month field 328, a day field 330 and/or a time field 332. Selecting or accessing each of these fields 326, 328, 330 and 332 opens a respective popup dialog box (not shown) that provides a functionality to enter an appropriate value for each of these fields 326, 328, 330 and 332. A popup indicator 334 is present at each location where a popup dialog box is available. Selecting the calendar configuration area 320 and then pressing the defer button 318 creates an entry in an appointment calendar 120 at the date and time specified. Other mechanisms are possible to select a time and date in an appointment calendar to schedule a return time at which to re-schedule an incoming communication, such as, for example, by allowing a user to type the date and/or time for the return call. Pressing the cancel button 336 returns a user to the initial screen 204.

Calendar-Based Scheduling

Figure 4:
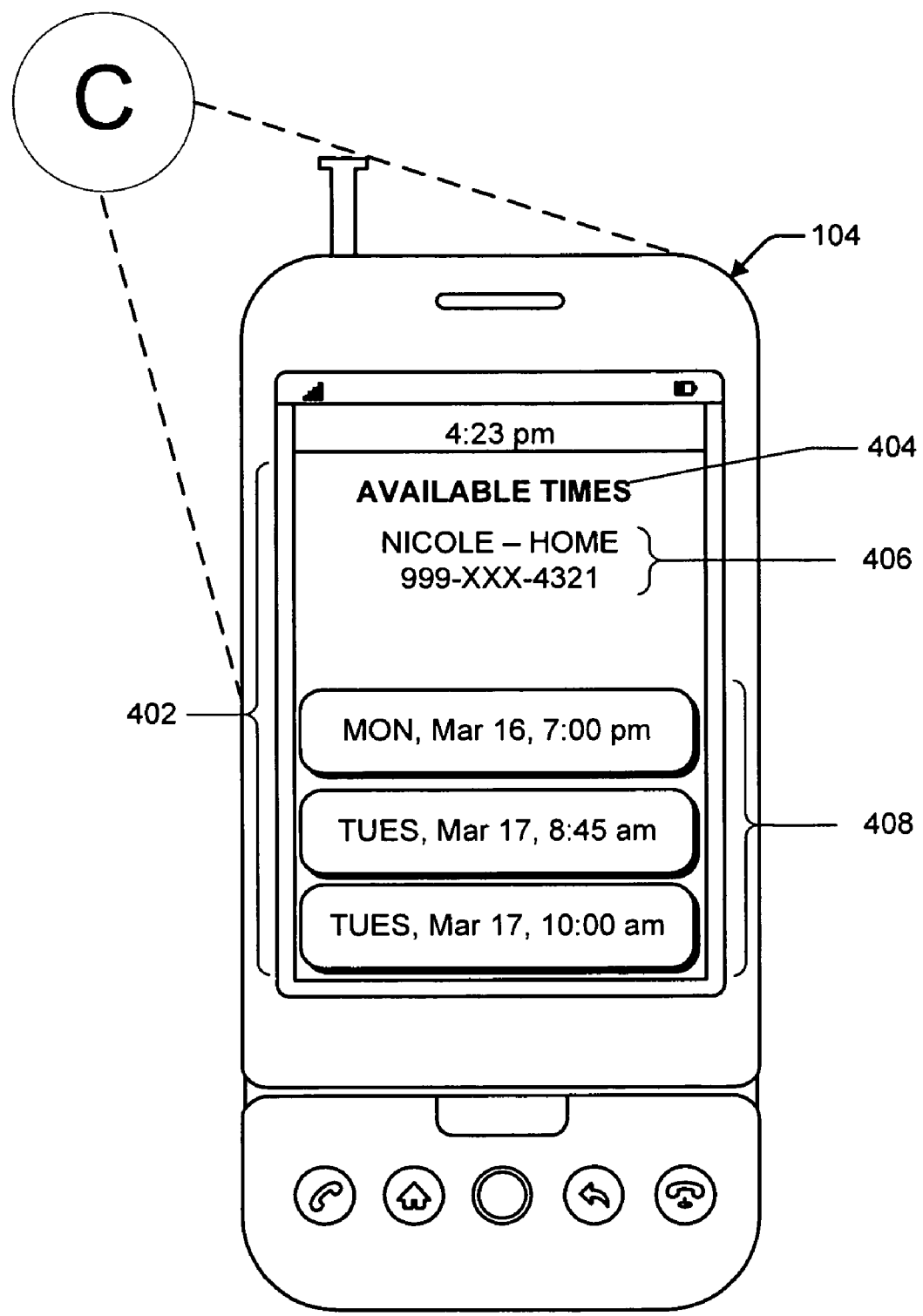
FIG. 4 shows an exemplary user interface on a telecommunications device usable to automatically schedule a return communication based on an appointment calendar.

FIG. 4 illustrates a calendar-based call defer screen 402, which is launched in response to the user pressing the defer button 216 (shown in FIG. 2) when the first telecommunications device 104 is configured for calendar-based scheduling of deferred communications. The purpose of the calendar-based call defer screen 402 is to automatically or semi-automatically schedule an available time for a return communication based at least in part on an appointment calendar of the recipient of the communication, the originator of the communication, or both. This purpose is shown in a title area 404 as "AVAILABLE TIMES." The automatic scheduling screen 402 may also show incoming communication information 406. In this example, the automatic scheduling screen 402 also shows one or more next available times 408. The first telecommunications device 104, a system component, or combination of devices and/or system components determines these next available times 408 by reference to an appointment calendar of the first user 102, the third user 112, or both. Selecting one of these next available times re-schedules an incoming communication in the appointment calendar 120.

In another variation of calendar-based scheduling, pressing the defer button 216, and thereby executing automatic scheduling, automatically re-schedules or defers the incoming communication at the chronologically next available time 408 (e.g., Monday, March 16 at 4:00 pm, as shown in FIG. 4), without further input from a first user 102.

Confirmation

Figure 5:
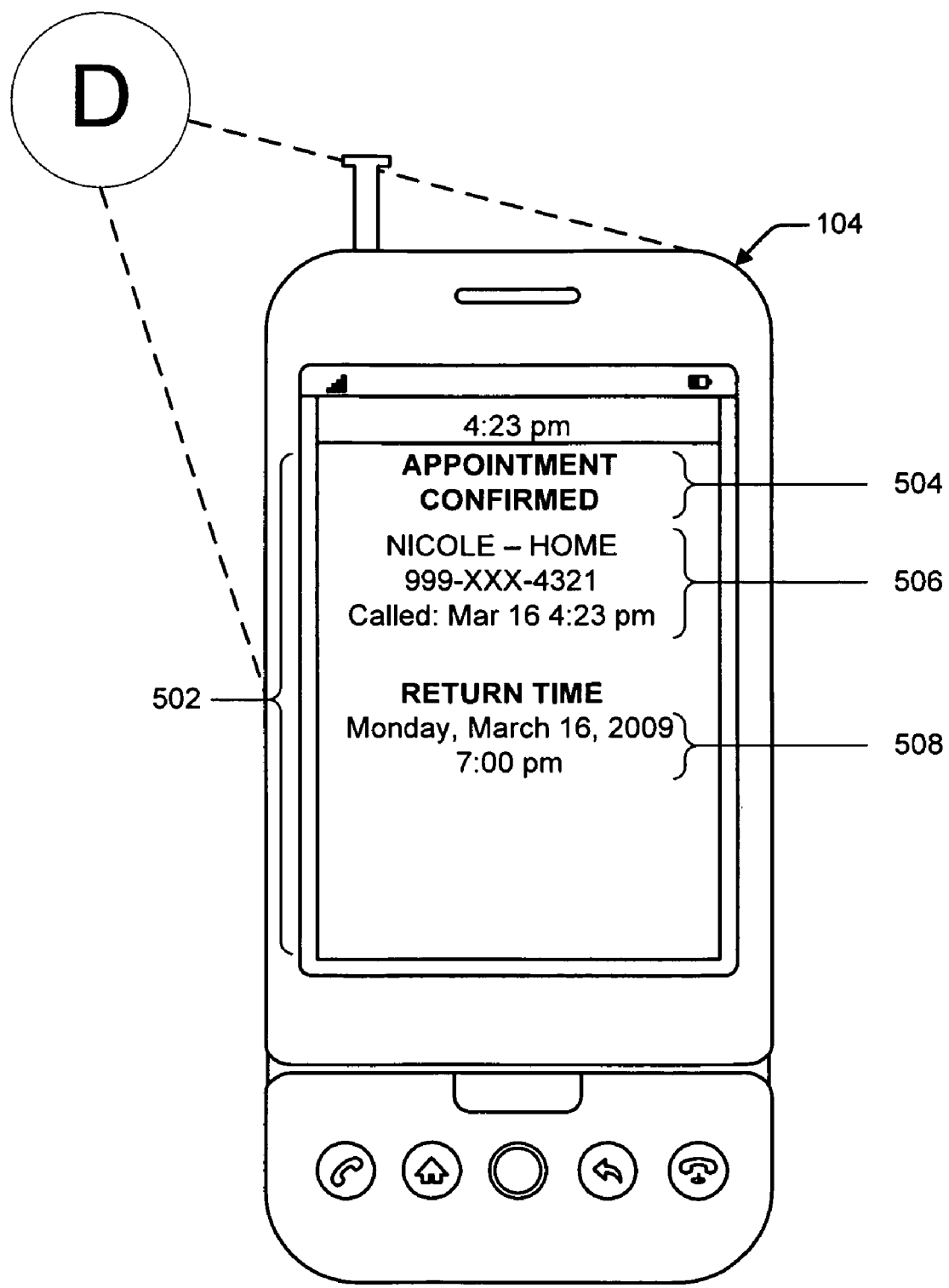
FIG. 5 shows an exemplary user interface on a telecommunications device of a confirmation of a scheduled return communication time.

FIG. 5 shows an exemplary user interface screen 502 indicating successful rescheduling of an incoming communication that may be displayed in response to any of the manual or calendar-based scheduling techniques described herein. In one implementation, the user interface screen 502 comprises a rescheduling message or message area 504, incoming communication information 506, and scheduling information 508. FIG. 5 shows scheduling information, including a date and time indicating that a calendar date and time is selected. However, if the communication defer mechanism were set for manual scheduling and a return time 312 were specified, scheduling information 508 could be shown as just a time (e.g. 30 minutes), and could be updated with the passage of time. Other mechanisms can additionally or alternatively be used to confirm rescheduling.

Notifying Originator

Figure 6:
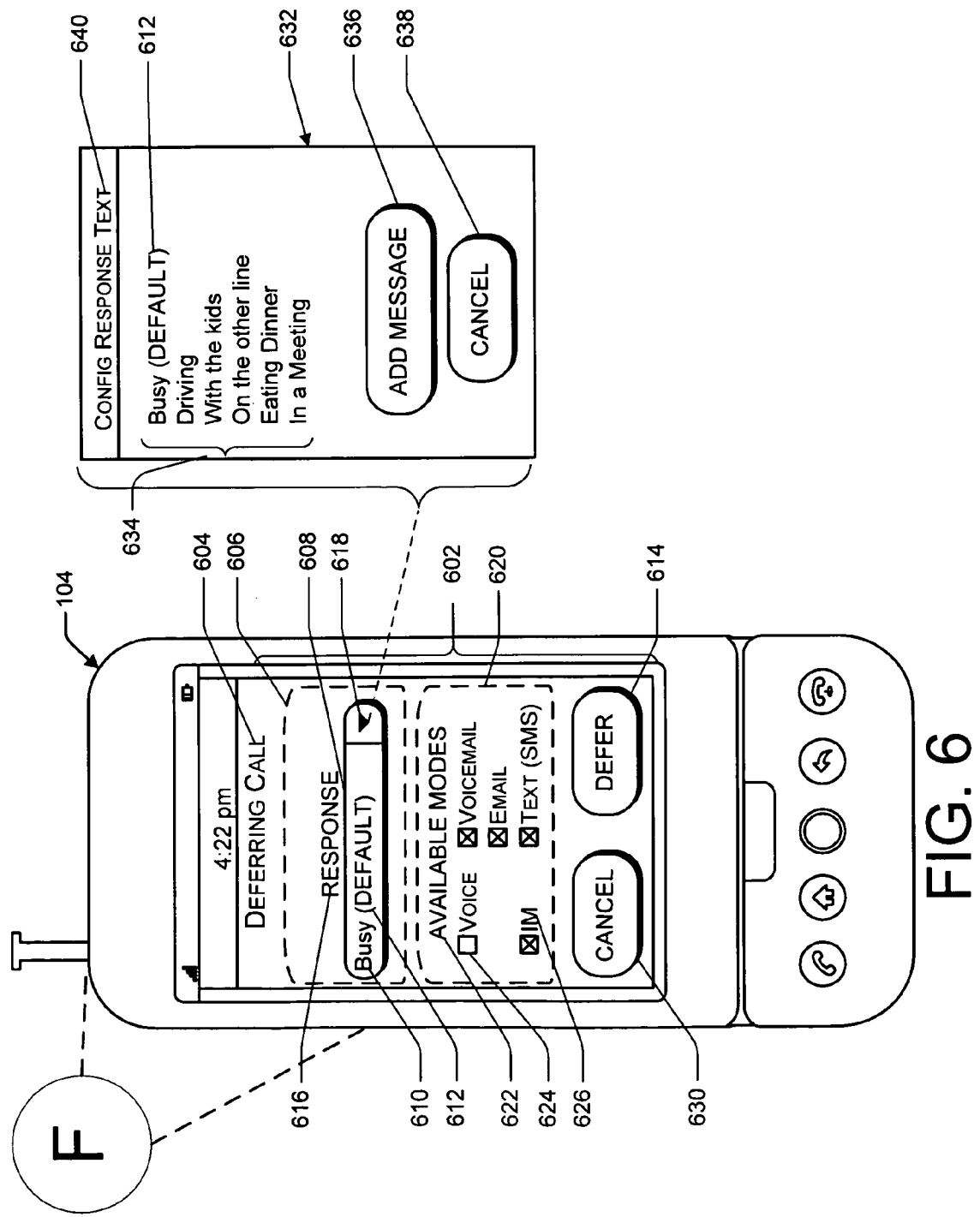
FIG. 6 shows an exemplary user interface on a telecommunications device usable to enter defer response text to be sent to an originating telecommunications device.

FIG. 6 shows an exemplary implementation of a defer response generation screen 602 for specifying a defer message to deliver to an originator device 114. Delivering a defer message or defer response to an incoming communication to an originating telecommunications device 114 is optional. The defer response generation screen 602 includes a title area 604 indicating this purpose. The defer response generation screen 602 also includes a "defer message" or first configuration area 606 and an "available modes" or second configuration area 620.

The first configuration area 606 provides mechanisms to configure a first portion of information for a defer message. Specifically, the defer message configuration area 606 contains a status message field 608 through which a user can select one of several possible status messages to deliver to the originating caller. The defer message comprises a status text 610. FIG. 6 shows the status text 610 as "busy." This particular status text 610 is a default status text 612 and is marked accordingly. The first configuration area 606 also contains a first title or title area 616, which marks the purpose of the first configuration area 606, and a status text popup activator 618. Selecting the status text popup activator 618 opens a status text configuration screen 632.

The status text configuration screen 632 contains a default status text 610 and several pre-programmed or previously entered status texts 634. In the implementation shown, each of the pre-programmed status texts 634 is selectable. Selecting one of the pre-programmed status texts 634 closes the status text configuration screen 632. The status text configuration screen 632 also contains an add message button 636. Pressing the add message button 636 launches another functionality (not shown) that allows a user to enter a user-defined status text. If entered, the user-defined status text is added to the list of status texts 634. A user may make any of the status texts 634 a default response message 612. For example, dragging one of the status texts 634 to the top of the list makes the newly first-listed status text the default status text 612. Other mechanisms are possible to select one of the status texts 634 as the default status text 612. The status text configuration screen 632 also contains a cancel button 638. Pressing the cancel button 638 returns a user to the status generation response screen 602 without changing the default status text 612 or without changing the status text 610. A title area 640 indicates the purpose of the status text configuration screen 632.

The defer response generation screen 602 also may contain an "available modes" or second configuration area 620. The purpose of the second configuration area 620 is to configure a second portion of information to deliver to an originating device 114. A title area 522 marks the purpose of the second configuration area 620. The second configuration area 620 includes checkboxes 624, one for each available mode of communication 626. Each checkbox 624 is selectable. Selecting a checkbox 624 marks the corresponding mode of communication 626 for transmission as part of the second portion of information in a defer message. By sending one or more available modes of communication 626, a first user 102 is able to communicate to an originating or third user 112 which modes of communication the first user 102 is able to accept in lieu of original mode of communication of the incoming communication. For example, if the originating or third user 112 called in to initiate a voice communication, the first user 102 may send a defer response indicating that she is in a meeting and can only accept SMS text messages. In one implementation, each of the defer messages in the status message field 608 may have an associated pre-checked set of available modes of communication 626. The pre-checked set of available communication modes may be subsequently modified by a user before sending the message. For example, selection of the defer text "busy" may result in the modes of communication shown in FIG. 6 being pre-checked, indicating that the user cannot communication by voice, but is available to communicate by any of the checked communication modes (e.g., IM, voicemail, email, and text). These pre-checked boxes may be modified by the user (e.g., to uncheck one or more of the pre-checked options) before sending the message to the originating device 114.

Pressing a cancel button 630 closes the defer response generation screen 602 and returns a user to a previous screen without sending a defer response, defer response text 610, defer time message 622, or any mode of communication 626, to an originating or third device 114.

Pressing the defer button 614 delivers a defer message to the originating device 114 and third user 112. Pressing a defer button 614, without making any changes to the status message field 608, sends the default defer text 612 (e.g., "busy" as shown in FIG. 6) and any checked modes of communication 626. When the defer response generation screen 602 is launched, one or more of the modes of communication 626 and corresponding checkboxes 624 may be selected by default or depending on the mode of communication of the original incoming communication.

The defer response generation screen 602 illustrates one way in which the first user 102 can quickly convey to an originating or third user 112 that the first user 102 is occupied, but will return the communication at a specified time. However, other mechanisms can be used to deliver a defer message to an originating device 114, and thereby the originating or third user 112.

In other implementations, a defer message may be created and delivered automatically either when a first user 102 manually selects a return time 312 or when a next available time 408 is selected by the first user 102 or identified and used by a system component. The content of the defer message is consistent with either the return time 312 or next available time 408, as appropriate.

Originator User Interface

Figure 7:
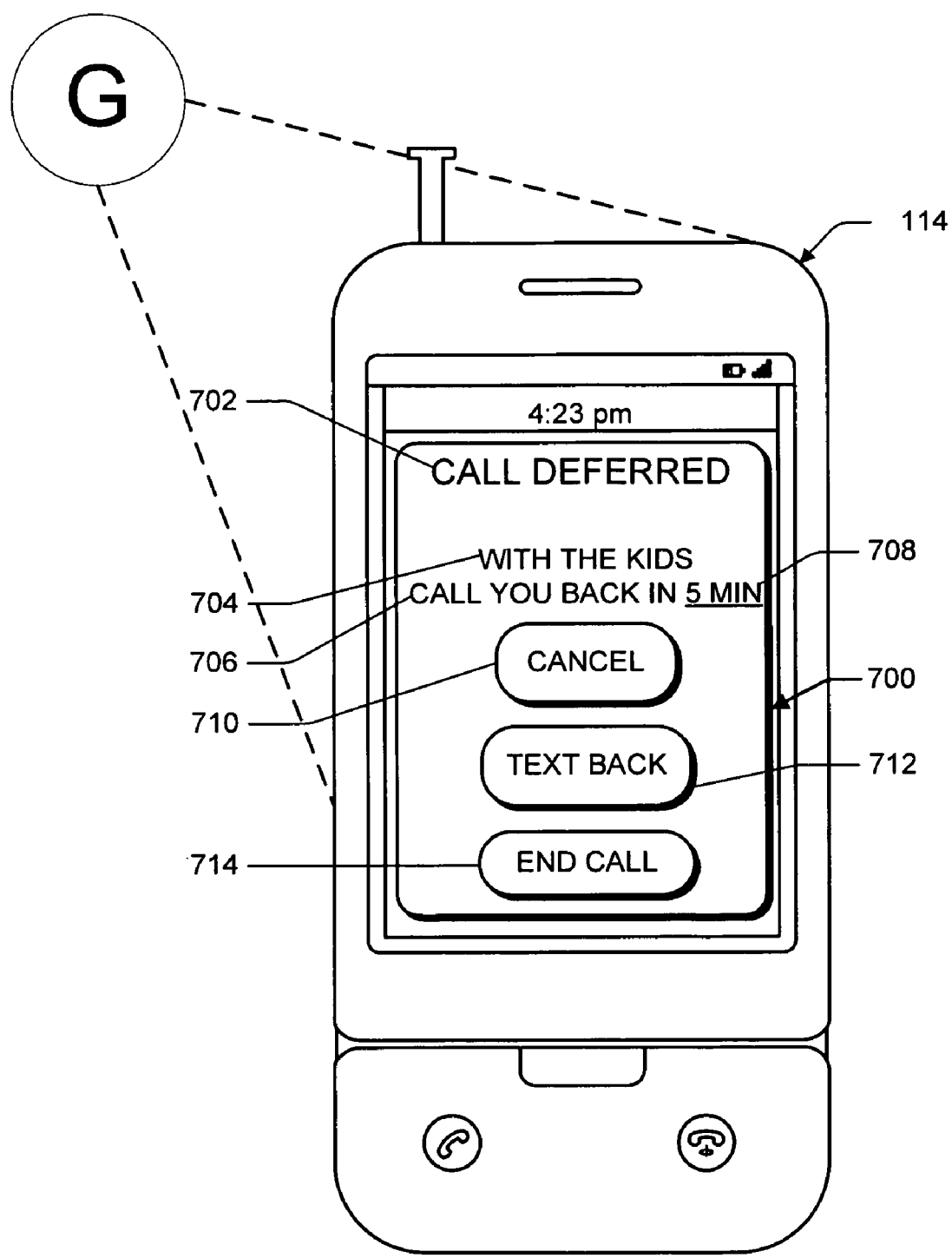
FIG. 7 shows an exemplary user interface showing an implementation of an originating telecommunications device user interface upon receiving a defer message.

FIG. 7 shows an exemplary implementation of a deferred message screen 700 as part of an exemplary originator UI or mode 118, which may be implemented on the third telecommunications device 114. Delivery of the defer message to the originating telecommunications device 114 activates the deferred message screen 700 and originator UI or mode 118.

The deferred message screen 700 comprises a defer announcement 104 indicating that the first user 102 deferred or rescheduled an incoming communication. The defer announcement 702 may take any form including an audible, visual or tactile signal, or any combination of forms. The deferred message screen 700 also comprises a defer response text 704. The defer response text 704 shown on the originator UI or mode 118 may be the same, different or modified as compared to the defer response text 610 selected by the first user 102. The deferred message screen 700 also comprises a defer time message 706 and a call defer time 708. The defer time message 706 and the call defer time 708 may be the same, different or modified as compared to the defer time message 620 and call defer time 622 selected on the first telecommunications device 104 by the first user 102. In one implementation, a deferred message screen 700 also comprises a cancel button 710. Pressing the cancel button 710 cancels the scheduling and reminder mechanism or functionality which was initiated by pressing a defer button by a first user 102 or initiation of a defer mechanism by the system 100.

The deferred message screen 700 also comprises a text back button 712. The deferred message screen 700 may also comprise one or more other buttons (not shown) depending on the available modes of communication 626 selected by a first user 102 and communicated to the third telecommunications device 112 as part of a defer message. Pressing one of the other buttons launches a corresponding application or functionality to communicate according to a corresponding mode of communication. Pressing the text back button 712 launches a texting screen, application, or functionality (not shown) that allows the originating third user 112 to compose and send an asynchronous text message from the originating third telecommunications device 114 to the first telecommunications device 104. Such asynchronous message may take the form of an SMS text message. Other forms of an asynchronous message are possible such as delivering a multimedia message, voice message or email message. In this way, the originator or third user 112 can send a reply when further communication to the first user 102 is warranted. Pressing the text back button 712 on the deferred message screen 700 turns a request for a synchronous communication into an asynchronous exchange.

In one implementation, selecting the defer button 216 by the first user 102, or pressing either the cancel button 710 or selecting the text back button 712 ends the communication originated from the third telecommunications device 114 to the first telecommunications device 104.

A defer message delivered to the originating or third phone 114 informs the third user 112 why the originated communication was not answered by the first user 102. In the exemplary scenario described herein, a defer message provides to the third user 112 a time at which to expect to talk or otherwise communicate synchronously with the first user 102. With one or more button presses, the first phone user 102 sends timely information to the incoming caller 112 without accepting and engaging in the original communication.

Reminders

In one implementation, the first telecommunications device 104 can be configured so that pressing the defer button 216 also schedules a reminder to initiate a communication to the originating or third telecommunications device 114 and third user 112. In this implementation, the first telecommunications device 104 stores the reminder. Alternatively, another device, database, or location in the communication system 100 stores the reminder. Pressing the defer button 216 may create the reminder as a calendar entry, place the reminder in a list of reminders for the first user 102 to access, or may create a reminder with an activated timer to expire at a designated time. In another implementation, pressing the defer button 216 causes an SMS text message to be delivered to the first telecommunications device 104 at an appropriate time, for example at the current time 218 plus a return time 312.

In another implementation, an appointment calendar application (not shown) activates a reminder to return a communication to the telecommunications device 114 and originating caller 112 at the appropriate time. The calendar application may operate on the first telecommunications device 104, third telecommunications device 114, or on some other device or component of the system 100.

Note that although the described implementation allows the first user 102 to decide whether or not to defer an incoming communication, the telecommunications device might also be configured to automatically—without user intervention—defer any communication that is received such as while the telecommunications device user is already engaged in another communication. Defer messages in this implementation may be based on one or more pre-configured options set by the first user 102.

Figure 8:
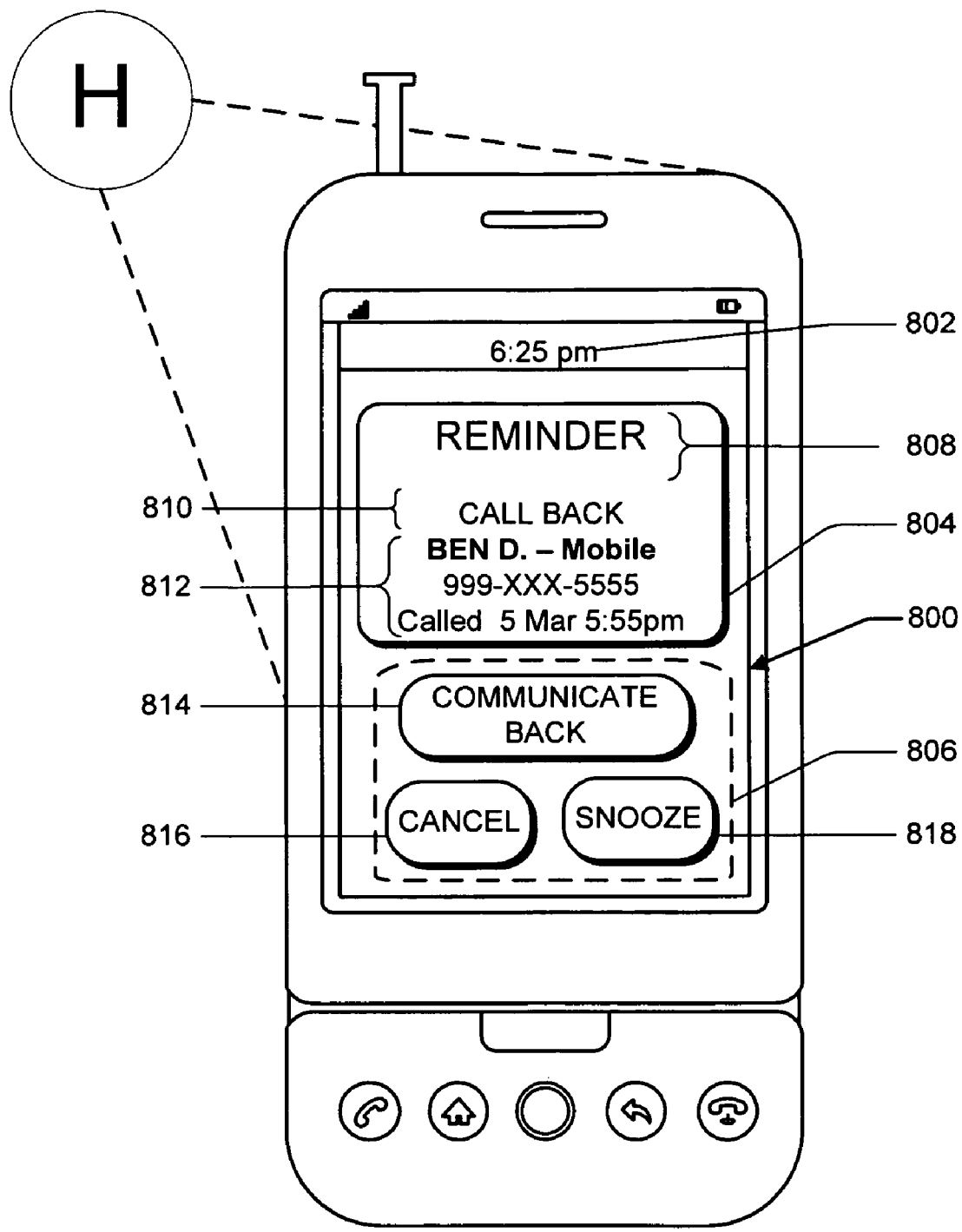
FIG. 8 shows an exemplary user interface showing one implementation of a reminder to return a communication at a designated or deferred time. The reminder may be presented at the originating telecommunications device and/or the receiving telecommunications device.

FIG. 8 shows an exemplary reminder screen 800 that appears at a designated time 802 such as a scheduled time, reminder time, or next available time. At the designated time 802, an application operating on the first telecommunications device 104 activates the reminder screen 800. The reminder screen 800 is comprised of a reminder area 804 and a call handling area 806. The reminder area 804 is comprised of a reminder title area 808, a reminder task 810, and reminder task information 812. The reminder task 810 may be generated locally on the telecommunications device or may come from or be in response to some other component or device in the telecommunications device or system. The appropriate time may be determined by the telecommunications device receiving the reminder or by some other component or device in the system. The reminder information 812 comprises caller ID or other information in addition to the number from which the communication originated. The reminder information 812 is the same information obtained at the time of the original incoming communication, the information obtained at the time the reminder is generated, or is some other information available to the system 100, first telecommunications device 104, third telecommunications device 114, or any combination thereof.

The communication handling area 806 provides a communicate back button 814, a cancel button 816, and a snooze button 818. Pressing the communicate back button 814 initiates a communication with the originating or third telecommunications device 114 corresponding to the reminder information 812. In one implementation, pressing the communicate back button 814 initiates a communication in the same mode in which the incoming communication was received, by default, or provides a mechanism by which a user chooses which mode of communication to use in communicating back to the device corresponding to the reminder information 812. In an alternative implementation, the communicate back button 814 initiates another, more appropriate device, or uses another communication protocol or means than was originally used in the original communication. Such more appropriate device, communication protocol or means may depend upon the time of the return communication and an appointment or other calendar accessible to one or more components or devices in the system 100. Pressing the cancel button 816 cancels the reminder without taking any further action. The communication handling area 806 may contain other functionality and may provide other options to a user. Pressing the snooze button 818 postpones the reminder for a fixed amount of time (e.g. 10 minutes), a next available time on one or more appointment calendars, or to another future time.

Return Communication List

Figure 9:
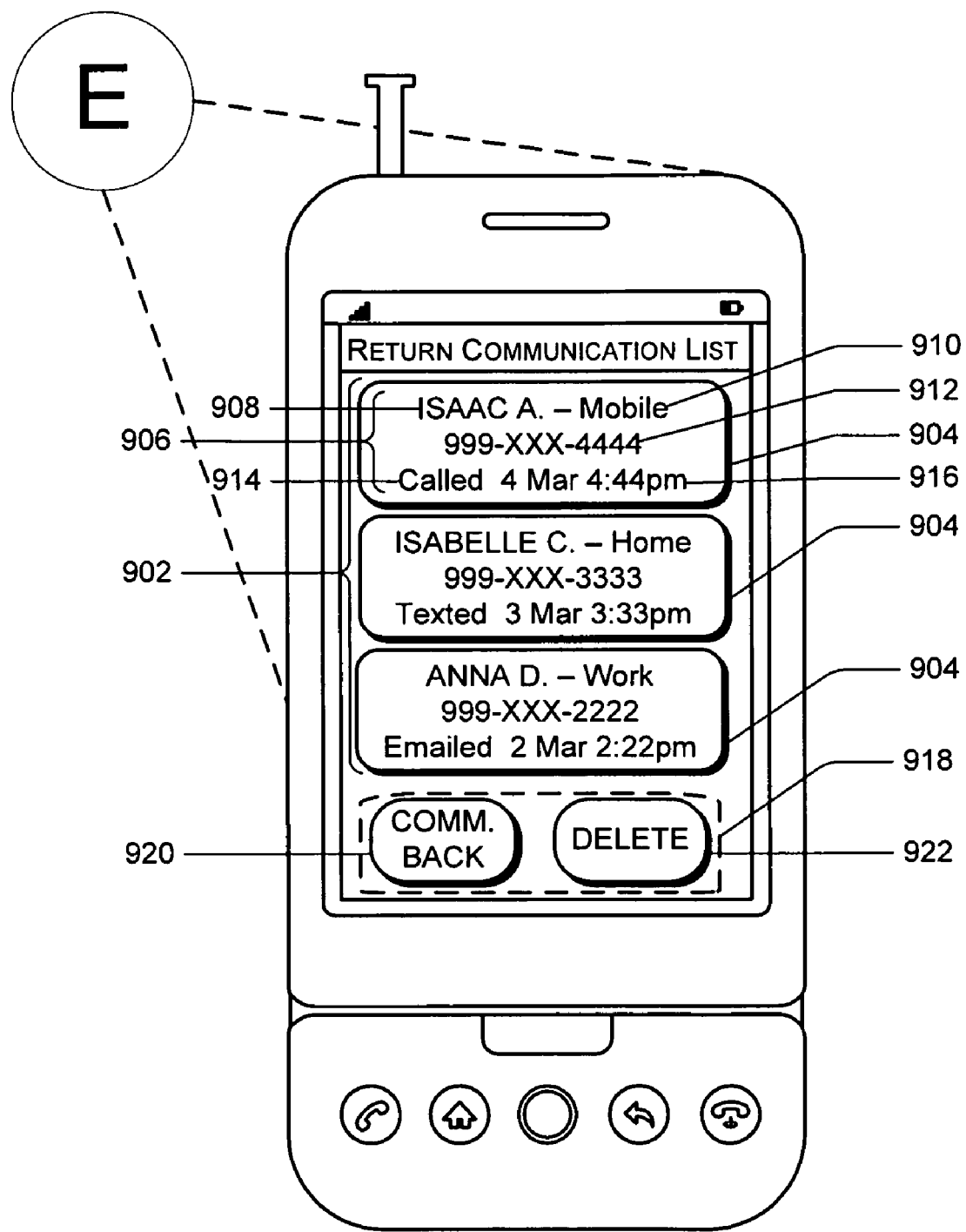
FIG. 9 shows an exemplary user interface showing one implementation of a return communication list operable on a telecommunications device.

FIG. 9 shows an exemplary user interface showing one implementation of a return communication list 902 accessible by a telecommunications device. The return communication list 902 shown in FIG. 9 may comprise a return communication list 122, an originator list 126, or a server-side return communication list 128, and may reside in memory of the telecommunications device 104, the originating device 114, and/or one or more network servers 124. The return communication list 902 is comprised of return communication entries 904 of incoming communications for which an instruction has been received to defer the incoming communication and for which a return communication has not yet been initiated. In the illustrated example, each return communication entry 904 is comprised of incoming communication information 906 such as a name 908, a type of device 910, a telephone number 912, incoming communication mode 914, and incoming communication time 916.

Selecting one or more of the return communication entries 904 activates a list entry handling section 918. The list entry handling section 918 provides functionality to handle return communication entries 904. For example, as shown in FIG. 9, the list entry handling section includes a communicate back button 920 and a delete button 922. Pressing the communicate back button 920 initiates subsequent user interface elements and functionality (not shown), through which to initiate and conduct or compose a return communication to one or more selected return communication entries 904. The mode of the return communication may be the same or different than the incoming communication mode 914. Pressing the communicate back button 920 may activate a default return communication mode or a user interface popup or other element may prompt a user to select a return communication mode. Selecting a return communication entry 904 and pressing the delete button 922 removes the return communication entry 904 from the return communication list 902.

Other Considerations

Other implementations are possible for scheduling a return communication to the third telecommunications device 114. For example, in an alternative implementation, a first available time in a calendar of the first user 102 may be marked as a default time to schedule a return communication. The reminder is then tied to the calendar of the first telecommunications device user 102 and is treated as any regular calendar entry (and reminder) through a calendar application operating on the first telecommunications device 104. Alternatively, the reminder may be placed in a list of communications to be returned at a future time convenient to the first user 102. The list of communications may be stored on the first telecommunications device 104, the server(s) 124, or at some other location in the system 100.

In another implementation where both the first telecommunications device 104 and the third telecommunications device 114 have calendaring or scheduling functionality, upon the first user 102 deferring a communication, the system 100 checks both the calendar 120 of the first telecommunications device 104 and the calendar 122 of the third telecommunications device 114 to determine a mutually available time at which to reach each other. In such an implementation, a defer communication application operating on the first telecommunications device 104 determines an available time for the first telecommunications device user 102. The defer communication application communicates the date and time of a suggested return communication to the third telecommunications device 114. The third telecommunications device 114 checks the calendar or schedule 122 of the third user 112 and determines if the suggested return communication date and time are available. If the suggested return communication date and time are unavailable, an application operating on the third telecommunications device 114 sends a return message with an updated suggested date and time for a return communication. The two telecommunications device applications may iterate back and forth until a mutually available time is determined. The date and time is then scheduled on or for both the first telecommunications device 104 and the third telecommunications device 114. Such an implementation allows users to schedule a mutually agreeable or mutually available time at which to engage in a synchronous communication. Such a scheduling mechanism is particularly advantageous if the first user 102 and the third user 112 are in different time zones or if they have busy schedules.

Other implementations are possible for scheduling a return communication to an originating caller from the simplest reminder to sophisticated scheduling and confirmation. Calendaring and scheduling may take place at a first telecommunications device 104, an originating or third telecommunications device 114, or in whole or in part at other parts in the system 100. For example, the scheduling and calendaring for users of telecommunications devices may take place at a system device or system component or server 118 which manages calendars for a plurality of users including the calendar 120 of the first telecommunications device user 102 and the calendar 122 of the third user 112. A reminders or calendar entries may take place at various intervals to repeatedly prompt a user to initiate a return communication.

In yet another implementation, the first telecommunications device user 102 or third telecommunications device user 112 may use a device which does not have a screen or other functionality. In such implementation, a system component delivers a defer message as a voice message to the third telecommunications device 114 and third user 112 at the time the first user 102 defers the call or after the third user 112 terminates the call to the first user 102.

In yet another implementation, a defer message may comprise a computer-generated telecommunications device communication to the third telecommunications device 114 at the time or after a time the third user 112 terminates the communication to the first telecommunications device user 102. A defer message may also be an SMS text message delivered to the third telecommunications device 114 or to some other device or to some other location such as an email account accessible to the third user 112.

In yet another implementation, a first telecommunications device user 102 may use a touchtone telecommunications device with no display, means for operating a software application, and/or means for receiving an SMS text message. In such case, a system component may provide the first telecommunications device user 102 an audible sound indicating an incoming communication. The first telecommunications device user 102 may then press a button on a standard keypad (e.g., the number 3) to access a defer mechanism and accompanying options, including delivery of a default message. In this example, components in the communication system 100, not the first telecommunications device 104, provide such defer mechanism and options. The system 100 provides prompts that lead the first telecommunications device user 102 through defer options or defer menus. In such case, a third user 112 receives back a default message sent by a system component to the third telecommunications device 114. For example, the default message is a text message that states that the telecommunications device user 102 is busy and will return the call in 30 minutes. At the conclusion of the original call between the first user 102 and the second user 106, a system component delivers an automated communication to the first telecommunications device 104. The automated communication conveys the identity or telecommunications device number of the communication that was previously deferred, the number of the third telecommunications device 114. The telecommunications device user 102 is then able to use such information available in the system 100 to return the communication to the third telecommunications device 114 and third user 112.

Exemplary Network Topology

Figure 10:
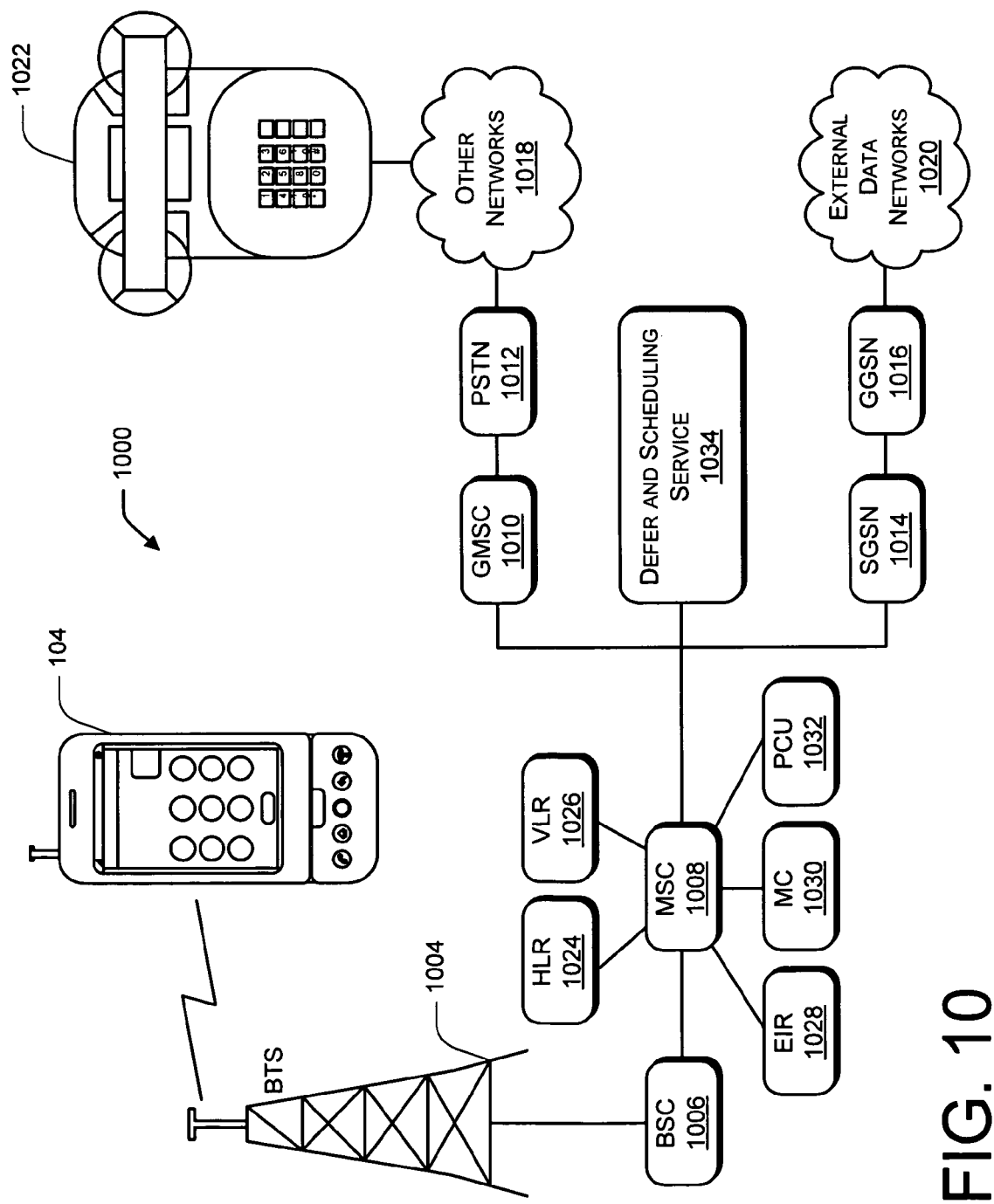
FIG. 10 shows an exemplary topology of a system in which an incoming communication can be deferred.

FIG. 10 is a diagram showing an overview of an exemplary system 1000 in which components combine to defer an incoming communication and schedule a return communication. Other components or equipment not shown may defer or assist in deferring a communication and may schedule or assist in scheduling a return communication.

The system 1000 comprises, in this example, a first wireless telecommunications device 104 such as a first telecommunications device 104, a base transceiver station (BTS) 1004, a base station controller (BSC) 1006, a mobile switching center (MSC) 1008, a gateway mobile switching center (GMSC) 1010, a public switched telephone network (PSTN) 1012, a serving GPRS support node (SGSN) 1014, and a gateway GPRS support node (GGSN) 1016, other phone networks 1018, external data networks 1020, and a second telecommunications device 1022 such as a third telecommunications device 114. GPRS is the general packet radio service for the global system for mobile communications (GSM).

The BTS 1004 sends and receives signals (e.g., data, information, voice communication) from the first telecommunications device 104. The BSC 1006 controls or operates the BTS 1004. The BSC 1006 sends and receives communications to the MSC 1008. The GMSC 1010 links the mobile network to the PSTN 1012 and other phone networks 1018. The first telecommunications device 104 thus sends and receives voice communications from the second telecommunications device 1022 through these components.

The MSC 1008 is connected to the SGSN 1014. The SGSN 1014 locates and authenticates data traffic in the system 1000. The GGSN 1016 converts data packets to and from GPRS tunneling protocol (GTP) packets. The GGSN 1016 also provides an interface to TCP/IP packets and allows data to reach the external data networks 1020 such as the Internet. The first telecommunications device 104 thus communicates with other devices such as non-mobile devices, non-wireless devices, and so forth. Though not shown in FIG. 10, packet data sent from the first telecommunications device 104 may ultimately end up traversing the SGSN 1014, GGSN 1016, and one or more external data networks 1020 and thereby reach the second telecommunications device 1022. The second telecommunications device 1022 may be a smart phone or some other device including a wireless device.

The MSC 1008 communicates with a home location register (HLR) 1024, a visitor location register (VLR) 1026, an equipment identity register (EIR) 1028, message center (MC) 1030, and a packet control unit (PCU) 1032, among various components. The HLR 1024 receives, stores, and provides the location of wireless communication and other devices registered with the MSC 1008. The VLR 1026 stores information, such as geographical information, about devices temporarily within the coverage area of an MSC 1008. The EIR 1028 stores unique numbers used to identify each device registered with or known to the MSC 1008. The MC 1030 enables short message services (SMS) in the system 1000, routing messages to and from devices operating in the system 1000. The PCU 1032 enables the MSC 1008 to handle packet or packetized data. The MSC 1008 has one or more machine readable media (not shown) which store one or more sets of instructions (e.g., software) embodying any one or more of the methodologies or functions described herein.

In one implementation, when a defer command is entered on the first telecommunications device 104, the system 1000 automatically determines the functionality of the second telecommunications device 1022 by accessing the information available to the EIR 1028, and thus the system 1000 tailors the defer message sent to the second telecommunications device 1022 accordingly. For example, if the second telecommunications device 1022 does not have a display and can only receive voice communications, a recorded or generated voice message may be delivered to the second telecommunications device 1022 upon a user entering a defer command on the first telecommunications device 104.

In another implementation, a defer and scheduling service 1034 defers, schedules, or both defers and schedules, a return communication to the second telecommunications device 1022. The scheduling service 1034 may just perform portions of deferring and scheduling. The defer and scheduling service 1034 may be part of the MSC 1008 or may be electronically connected to the MSC 1008 or some other part or portion of the system 1000. The defer and scheduling service 1034 may comprise one or more separate devices, software operating on one or more components of the MSC 1008, software operating on some other part of the system 1000, or any combination of devices and software. The HLR 1024 or VLR 1026 may provide information for deferring or scheduling an incoming communication. The MC 1030 may provide texting services for deferring or scheduling if SMS or other text messaging is used. The PCU 1032 may provide services if packetized data is used in deferring an incoming communication and scheduling a return communication.

Exemplary Device

Figure 11:
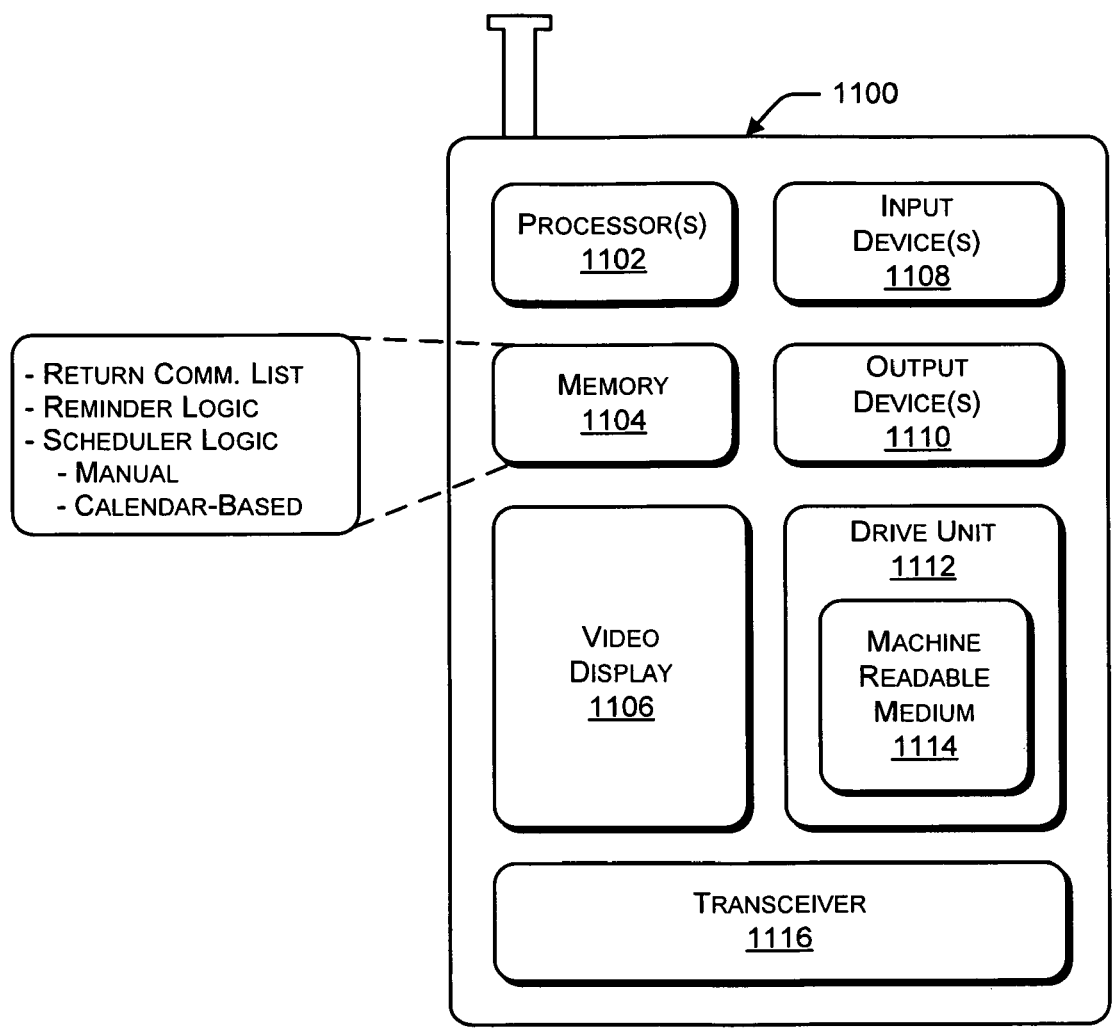
FIG. 11 shows an exemplary telecommunications device that can be used to defer an incoming communication and to schedule a return communication to an originating telecommunications device.

FIG. 11 shows an exemplary telecommunication device 1100 such as may be used to defer an incoming communication and to schedule a return communication to an originating caller. In many cases, device 1100 will be what is commonly referred to as a "cell phone," although the described techniques can be used in conjunction with non-cellular technologies such as conventional analog AM or FM radio, WI-FI®, WiMAX®, and other analog and digital wireless voice and data transmission technologies.

With reference to FIG. 11, a telecommunication device 1100 comprises one or more processors 1102, and a memory 1104, a video display 1106, one or more input devices 1108, one or more output devices 1110, a drive unit 1112 which can access a machine readable medium 1114, and a transceiver 1116. The machine readable medium 1114 stores one or more sets of instructions (e.g., software) embodying any one or more of the methodologies or functions described herein. The instructions may also reside, completely or at least partially, within the memory 1104 and within the processor 1102 during execution thereof by the telecommunication device 1100. The memory 1104 and the processor 1102 also may constitute machine-readable media.

The input device 1108 may be a keyboard, keypad, touch screen, or microtelecommunications device. Other input devices 1108 may be used. The video display 1106 may be a liquid crystal display (LCD), a flat panel, a solid state display or other device. The processor 1102 may be a central processing unit (CPU), a graphics processing unit (GPU), or both CPU and GPU, or other processing unit or component.

Exemplary Methodology

Figure 12:
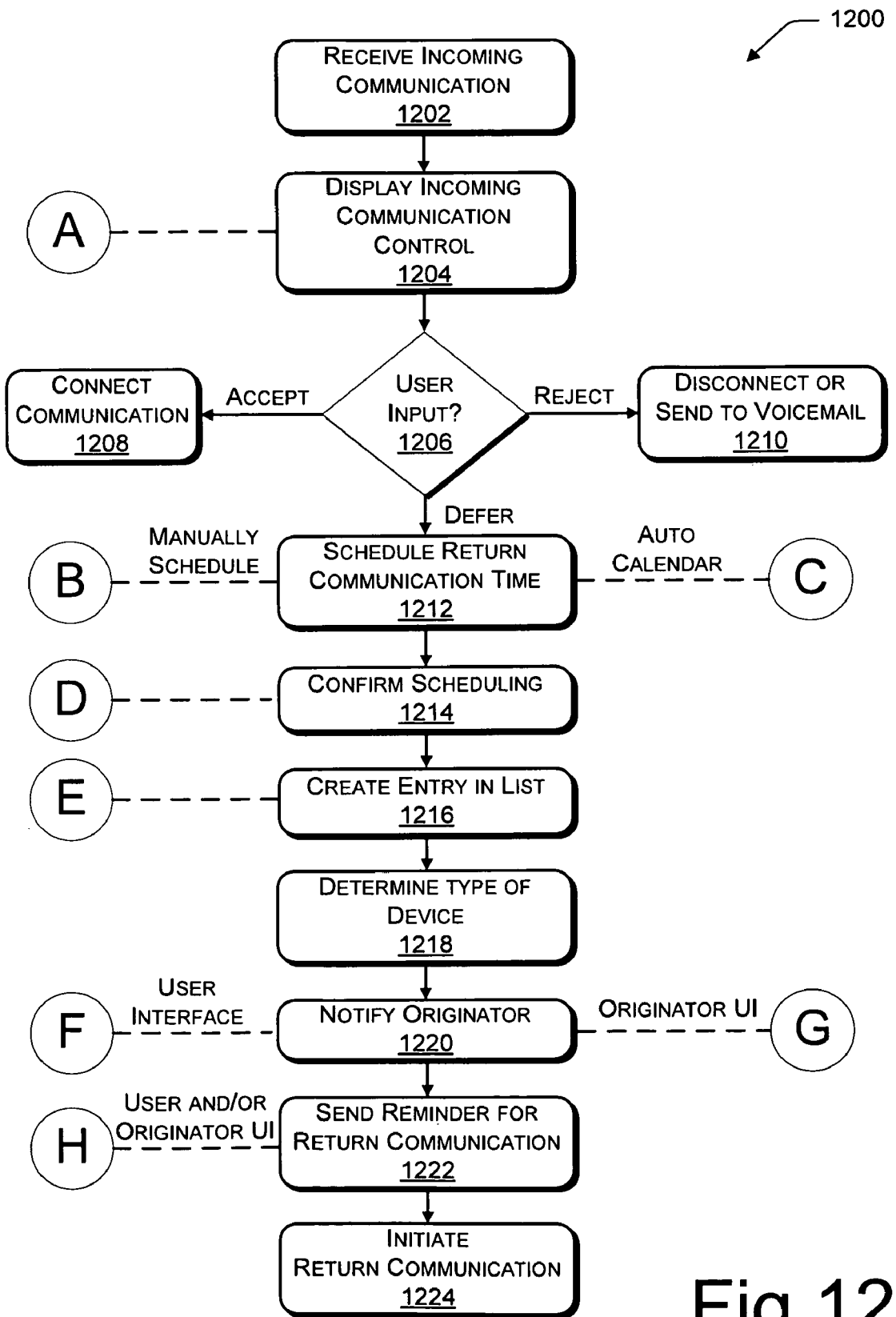
FIG. 12 shows an exemplary logic flow diagram and method of receiving and deferring an incoming communication along with callouts A through H showing where exemplary user interfaces corresponding to each block in the flow diagram are found in the drawings. Callout A corresponds to the user interface shown in FIG. 2. Callout B corresponds to FIG. 3. Callout C corresponds to FIG. 4. Callout D corresponds to FIG. 5. Callout E corresponds to FIG. 9. Callout F corresponds to FIG. 6. Callout G corresponds to FIG. 7. Callout H corresponds to FIG. 8.

FIG. 12 shows an exemplary logic flow diagram and method 1200 of deferring an incoming communication and scheduling a time for a user to return a communication between a first user 102 and an originating or third user 112. Callouts A through G show where exemplary user interfaces, corresponding to each block in the logic flow diagram, are found in the drawings. Callout A corresponds to the user interface shown in FIG. 2. Callout B corresponds to FIG. 3. Callout C corresponds to FIG. 4. Callout D corresponds to FIG. 5. Callout E corresponds to FIG. 6. Callout F corresponds to FIG. 7. Callout G corresponds to FIG. 8.

With reference to FIG. 12, an incoming communication is received 1202. The incoming communication may be a request to accept or initiate a synchronous communication such as a voice call.

Next, an incoming communication control is displayed 1204. If a user input is received 1206, a user can take one of several actions including to accept a communication, to defer the incoming communication, or to deny a request to initiate a synchronous communication. If a user accepts the incoming communication, the system connects 1208 the two or more devices. If a user rejects the incoming communication, the system or one of the devices disconnects 1210 the incoming communication or sends the originating communication to a voicemail application.

If a user defers the incoming communication, a component of the system, such as the telecommunications device, schedules 1212 a return or defer communication time. The return communication time may be scheduled manually or may be automatically scheduled at least in part on one or more appointment calendars.

Next, a component of the system, such as a telecommunications device, confirms 1214 a scheduled return communication time. For example, a confirmation screen is displayed on the device for a brief time.

Upon deferring a communication, an application or system component may create 1216 an entry in a return communication list. For example, upon deferring an incoming voice communication, the identity of the incoming caller and an incoming call time may be added to an entry and stored in a return communication list.

Next, at 1218, the type of device operated by one or more of the users may be determined. For example, a system component determines which type of device the originating caller is using (e.g., smart phone or simple touchtone phone). Or, one or more of the devices may communicate the type of device being used.

A component of the system notifies 1220 the originator that the incoming communication has been deferred. In one implementation, a message may be delivered to the originating telecommunications device. The defer message may take one of several forms, or may be delivered serially in a variety of forms.

In one implementation, at a return communication time, a reminder may be sent, delivered or activated 1222 to prompt for a return communication. For example, an SMS text message may be sent to a telecommunications device to prompt a user to return or initiate a return communication between the first user and originating or third user.

Then, a return communication may be initiated 1224 to the originating caller at or after the return communication time. The acts in the method 1200 described herein need not be performed in the order described, may be modified and/or may be omitted entirely, depending on the circumstances. For example, acts 1202 through 1210 may be omitted, and acts 1212 through 1224 may be initiated in response to some other action or instruction. In one specific example, a return communication may be scheduled in response to a notification of a failed incoming or outgoing communication. As used herein a failed communication is one in which a synchronous communication has not been able to be established. Examples of failed communications may include an indication of a missed incoming voice call, a deferred incoming voice call, an indication that an outgoing voice call has been deferred, an unanswered outgoing voice call (e.g. ringing without picking up or busy signal), an indication of reaching an outgoing voicemail box, and an indication of an incoming voice message.

In another alternative, initiating a return communication may comprise simply notifying a user of one of the telecommunications devices to be included in the return communication. Alternatively, one of the telecommunications devices or some other component of the system may be configured to automatically place the return communication at the scheduled time.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of handling an incoming communication to a telecommunication device, the method comprising:
    receiving the incoming communication on the telecommunication device at an incoming communication time;
    alerting a user of the telecommunication device to the incoming communication;
    receiving an instruction from the user of the telecommunication device to defer the incoming communication, the receiving including:
        presenting the user with an interface having a selectable control for deferring the incoming communication and a set of other modes of communication available to the user, one or more of the other modes being presented as pre-selected modes;
        enabling the user to select additional modes in the set of other modes or deselect one or more of the pre-selected modes; and
        receiving a user selection of the selectable control for deferring the incoming communication;
    sending a defer message to an originating device from which the incoming communication was placed, the defer message specifying the set of other modes; and
    prompting the user of the telecommunication device to return the incoming communication at a return communication time that is later than the incoming communication time.

2. The method of claim 1, wherein the prompting comprises repeatedly prompting the user of the telecommunication device at successive return communication times.

3. The method of claim 1, further comprising requesting the user of the telecommunication device to specify the return communication time.

4. The method of claim 1, further comprising:
- requesting the user of the telecommunications device to specify a time interval; and
- establishing the return communication time based on the specified time interval.

5. The method of claim 1, further comprising initiating a return communication at the return communication time.

6. The method of claim 1, further comprising activating a notification on the telecommunication device to initiate a return communication at the return communication time.

7. The method of claim 1, further comprising:
- automatically initiating a return communication at the return communication time; and
- notifying the user of the telecommunication device that the return communication has been initiated.

8. The method of claim 1, wherein the defer message is a textual message.

9. The method of claim 1, wherein the defer message is a voice message pre-recorded by the user of the telecommunication device.

10. The method of claim 1, the method further comprising formatting the defer message depending on capabilities of the originating device.

11. The method of claim 1, further comprising causing a record of the deferred incoming communication to be stored in a return communication list accessible by the telecommunications device.

12. The method of claim 11, wherein the return communication list comprises a list of incoming communications for which an instruction has been received to defer the incoming communication and for which a return communication has not yet been initiated.

13. The method of claim 11, wherein the return communication list is stored at least one of locally in memory of the telecommunications device or remotely in memory of a network server.

14. A system comprising:
- a telecommunications device having a processor and a memory, wherein the memory stores instructions that are executable by the processor to perform operations comprising:
  - receiving an incoming communication from an originating device at an incoming communication time;
  - prompting a user of the telecommunications device whether to defer the incoming communication, the prompting including:
    - presenting the user with an interface having a selectable control for deferring the incoming communication and a set of other modes of communication available to the user, one or more of the other modes being presented as pre-selected modes;
    - enabling the user to select additional modes in the set of other modes or deselect one or more of the pre-selected modes; and
    - receiving a user selection of the selectable control for deferring the incoming communication; and
  - responsive to deferring the incoming communication, sending a defer message to the originating device, the defer message specifying the set of other modes; and
- reminder logic responsive to deferring the incoming communication to prompt the user of the telecommunication device to return the incoming communication at a return communication time that is later than the incoming communication time.

15. The system of claim 14, the reminder logic being further responsive to deferring the incoming communication to repeatedly prompt the user of the telecommunication device at successive return communication times.

16. The system of claim 14, the operations further comprising requesting the user of the telecommunication device to specify the return communication time.

17. The system of claim 14, the operations further comprising activating a notification on the telecommunication device to initiate a return communication at the return communication time.

18. The system of claim 14, wherein the reminder logic is integrated with the telecommunications device.

19. The system of claim 14, further comprising a return communication list stored in the memory, the return communication list comprising a list of incoming communications for which an instruction has been received to defer the incoming communication and for which a return communication has not yet been initiated.

20. One or more tangible computer-readable storage media comprising computer-readable instructions stored thereon that, when executed by a first telecommunications device, cause the first telecommunications device to perform operations comprising:
- receiving the incoming communication on the first telecommunication device at an incoming communication time;
- alerting a user of the first telecommunication device to the incoming communication;
- receiving an instruction from the user of the first telecommunication device to defer the incoming communication, the receiving including:
  - presenting the user with an interface having a selectable control for deferring the incoming communication and a set of other modes of communication available to the user, one or more of the other modes being presented as pre-selected modes;
  - enabling the user to select additional modes in the set of other modes or deselect one or more of the pre-selected modes; and
  - receiving a user selection of the selectable control for deferring the incoming communication;
- sending a defer message to a second telecommunication device from which the incoming communication was placed, the defer message specifying the set of other modes; and
- prompting the user of the first telecommunication device to return the incoming communication at a return communication time that is later than the incoming communication time.

21. The one or more tangible computer-readable storage media of claim 20, the operations further comprising activating a notification on the first telecommunications device at the return communication time to perform the prompting.

22. The one or more tangible computer-readable storage media of claim 20, the operations further comprising, in response to receiving the indication to defer the requested synchronous communication, scheduling the return communication time at which to initiate a return communication with the second telecommunications device.

23. The one or more tangible computer-readable storage media of claim 20, wherein the defer message is a text message.

24. The one or more tangible computer-readable storage media of claim 20, wherein the defer message is a voice message.

25. The one or more tangible computer-readable storage media of claim 20, the operations further comprising formatting the defer message depending on capabilities of the second telecommunications device.

26. The one or more tangible computer-readable storage media of claim 20, the operations further comprising causing a record of the deferred incoming communication to be stored in a return communication list accessible by the first telecommunications device, the return communication list comprising a list of incoming communications for which an instruction has been received to defer the incoming communication and for which a return communication has not yet been initiated.

27. The method of claim 1, wherein the one or more other modes of communication include at least one of voice, voicemail email, instant messaging, or text.

* * * * *